(12) United States Patent
Grinshpun et al.

(10) Patent No.: US 9,854,282 B2
(45) Date of Patent: Dec. 26, 2017

(54) SYSTEM AND METHOD FOR ENABLING NETWORK BASED RATE DETERMINATION FOR ADAPTIVE VIDEO STREAMING

(71) Applicant: Alcatel Lucent, Boulogne-Billancourt (FR)

(72) Inventors: Edward Grinshpun, Freehold, NJ (US); David Faucher, Murray Hill, NJ (US); Sameer Sharma, Holmdel, NJ (US); Viorel Craciun, Ottawa (CA); Peter Beecroft, Murray Hill, NJ (US); Ingrid Van De Voorde, Murray Hill, NJ (US)

(73) Assignees: Alcatel Lucent, Boulogne-Billancourt; Alcatel-Lucent USA Inc., Murray Hill, NJ (US)

( * ) Notice: Subject to any disclaimer, the term of this patent is extended or adjusted under 35 U.S.C. 154(b) by 5 days.

(21) Appl. No.: 14/548,875

(22) Filed: Nov. 20, 2014

(65) Prior Publication Data

US 2016/0150255 A1    May 26, 2016

(51) Int. Cl.
*H04N 21/24* (2011.01)
*H04N 21/238* (2011.01)
*H04N 21/262* (2011.01)
*H04N 21/44* (2011.01)
*H04N 21/61* (2011.01)

(52) U.S. Cl.
CPC ... *H04N 21/23805* (2013.01); *H04N 21/2401* (2013.01); *H04N 21/2402* (2013.01); *H04N 21/2625* (2013.01); *H04N 21/44004* (2013.01); *H04N 21/6131* (2013.01)

(58) Field of Classification Search
CPC ............... H04N 21/23805; H04N 21/2401
See application file for complete search history.

(56) References Cited

U.S. PATENT DOCUMENTS

| | | | | |
|---|---|---|---|---|
| 9,203,886 B2* | 12/2015 | Balachandran | ......... | H04L 47/10 |
| 2008/0133766 A1* | 6/2008 | Luo | ......... | H04L 47/10 |
| | | | | 709/231 |
| 2010/0309987 A1* | 12/2010 | Concion | ......... | H04N 5/772 |
| | | | | 375/240.26 |
| 2011/0044192 A1* | 2/2011 | Wang | ......... | H04W 72/1221 |
| | | | | 370/252 |
| 2013/0191511 A1* | 7/2013 | Liu | ......... | H04L 67/2847 |
| | | | | 709/219 |
| 2014/0255007 A1* | 9/2014 | Chen | ......... | H04N 9/87 |
| | | | | 386/248 |

(Continued)

*Primary Examiner* — Brian T Pendleton
*Assistant Examiner* — Frank Johnson-Calderon
(74) *Attorney, Agent, or Firm* — Harness, Dickey & Pierce, P.L.C.

(57) ABSTRACT

In one example embodiment, a method of adaptive video streaming includes receiving, by a server, a request for a video segment from an end user device and determining, by the server, a plurality of variables, the plurality of variables including at least one of a download time of a previously requested video segment by the end user device, a fullness of a buffer at the end user device and a size of the buffer. The method further includes determining, by the server, a rate of the requested video segment based on one or more of the determined plurality of variables and sending, by the server, the requested video segment at the determined rate to the end user device.

16 Claims, 5 Drawing Sheets

(56) References Cited

U.S. PATENT DOCUMENTS

| | | | |
|---|---|---|---|
| 2014/0280760 A1* | 9/2014 | Hurst | H04L 65/60 709/219 |
| 2014/0282769 A1* | 9/2014 | Salem | H04N 21/23406 725/94 |
| 2014/0289781 A1* | 9/2014 | Frydman | H04N 21/23805 725/62 |
| 2015/0134784 A1* | 5/2015 | De Vleeschauwer | H04L 65/605 709/219 |

* cited by examiner

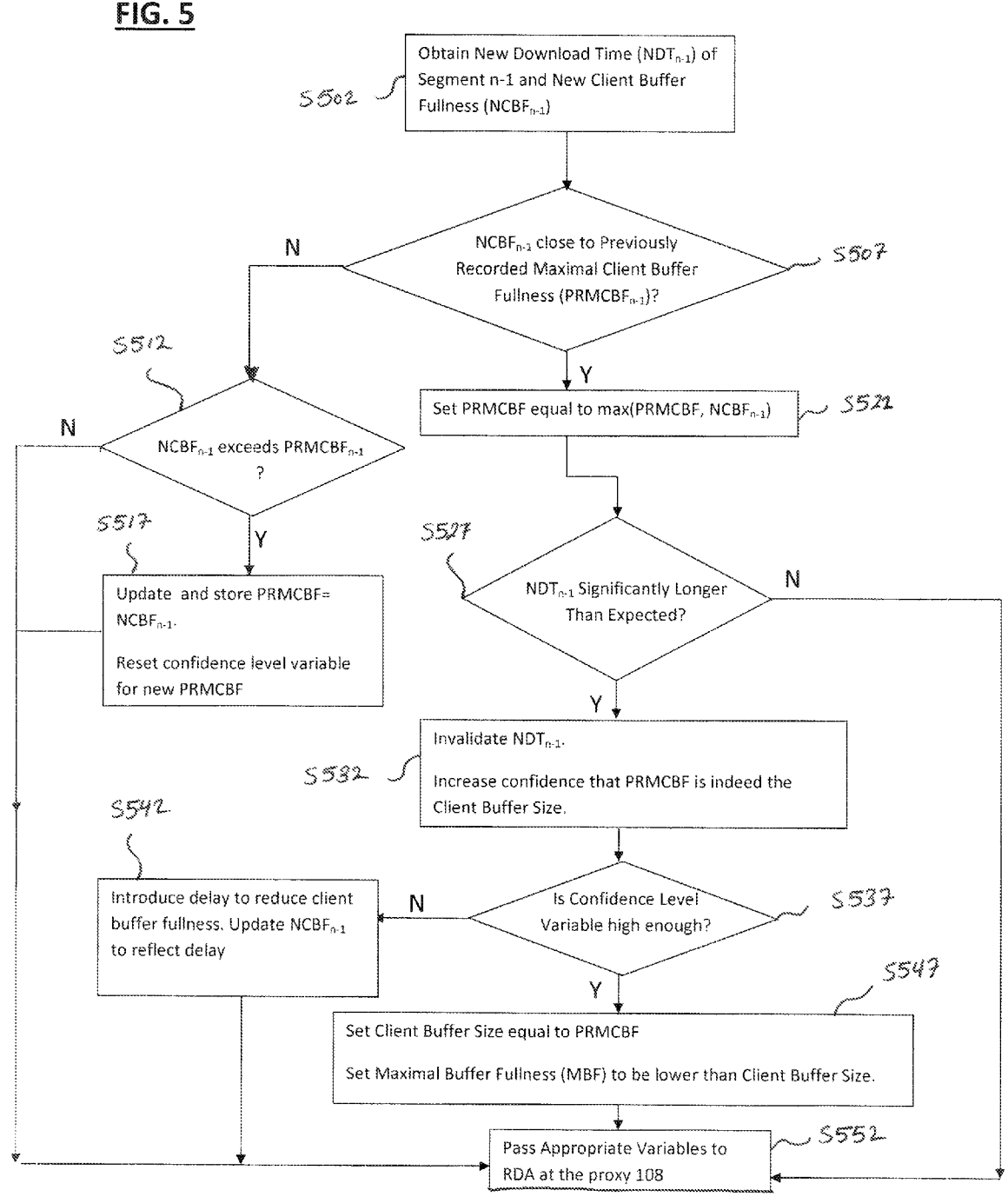

SYSTEM AND METHOD FOR ENABLING NETWORK BASED RATE DETERMINATION FOR ADAPTIVE VIDEO STREAMING

BACKGROUND

Dynamic Adaptive Streaming over HTTP (DASH—standardized by 3GPP and International Telecommunication Union (ITU)) is a widely adopted technique to deliver Video on Demand (VoD) services. A DASH client maintains a cache buffer for video data received at the DASH client in order to smooth out any variability of network conditions. The DASH client runs a Rate Determination Algorithm (RDA) to select a video rate for the next video data segment (located in a Content Cache of pre-encoded video segments) based on the DASH client's estimates of network throughput (which the DASH client may obtain by dividing a video segment size by the time elapsed between sending request for the video segment and completing the video segment download), the DASH client's cache buffer fullness and various heuristics. A higher video rate for the segment yields sharper picture and better end user quality of experience (QoE) at the expense of larger video segment size and more bandwidth required to deliver such segment. On the other hand, a lower video rate requires less bandwidth resources to deliver the video segment but is associated with more blurry or sometimes blocky picture. The use of various heuristics may ensure a certain level of stability in rate selection for different video segments as frequent variations in the rate selection from one video segment to another may contribute to a low user QoE.

With video data transmitted to mobile devices over a wireless channel, the above described client based RDA faces multiple challenges due to fast changing wireless channel quality, abrupt changes in over-the-air throughput, and DASH client's lack of wireless network wide view and its inability to quickly distinguish between different causes of measured throughput changes which require different RDA responses in order to maintain high user (QoE).

Furthermore, allowing a client to select the video rate implies that the client controls the load on Wireless Service Provider (WSP) network which leaves the WSP without effective means to manage the load of the network while providing high QoE.

One proposed solution to address the challenges described above is to place the RDA function at a network based DASH proxy instead of a DASH client, which allows to combine rate selection with wireless network wide view and knowledge thus achieving better rate selection decisions with faster and more adequate reaction to congestion and better correlation with wireless access network load management. This solution adds to the standard Content Delivery Network (CDN) HTTP proxy function a benefit of giving a WSP a new tool to control mobile network traffic by factoring WSP policy into rate selection calculation.

However, one major problem with the proposed solution for RDA function in the HTTP Proxy (which is far away from the client and from the wireless link) is to get accurate and adequate measurements of over-the air throughput together with estimates of a DASH client buffer size and fullness that are critical for adequate video data rate determination. Without such accurate and adequate measurements, an end user's QoE is worsened.

SUMMARY

Some example embodiments relate to methods and/or systems for network based rate determination for adaptive streaming of video segments over a wireless network to an end user device, where the rate of each video segment is determined based on estimates of the wireless network throughput for each segment, a client cache buffer fullness and a client cache buffer size.

In one example embodiment, a method for enabling a network based rate determination for adaptive video streaming includes receiving, by a server, a request for a video segment from an end user device and determining, by the server, a plurality of variables, the plurality of variables including at least one of a download time of a previously requested video segment by the end user device, a fullness of a buffer at the end user device and a size of the buffer. The method further includes determining, by the server, a rate of the requested video segment based on one or more of the determined plurality of variables and sending, by the server, the requested video segment at the determined rate to the end user device.

In yet another example embodiment, the method further includes obtaining, by the server, the requested video segment at the determined rate from a content cache and determining, by the server, whether to introduce a delay prior to the sending of the requested video segment to the end user device, wherein the sending delays sending the requested video segment to the end user by an amount of time equal to the delay upon the determining that the delay is to be introduced.

In yet another example embodiment, the determining the plurality of variables determines the download time of the previously requested video segment as a period of time from when the server sends a request to a content cache for the previously requested video segment until the server receives the request for the video segment.

In yet another example embodiment, the method further includes determining a throughput of the network as a ratio of a size of the previously requested video segment to the determined download time.

In yet another example embodiment, the determining the plurality of variables determines the fullness of the buffer as a difference between a combined duration of playing the previously sent video segments and an amount of time elapsed from when the end user initiated playing a requested first video segment.

In yet another example embodiment, the determining the plurality of variables determines the size of the buffer by determining whether a difference between the determined fullness of the buffer and a previously recorded maximum buffer fullness is less than a first threshold and determining whether the determined download time is longer than a second threshold if the difference is less than the first threshold. The method further includes determining the size of the buffer to be equal to the previously recorded maximum buffer fullness based on whether the difference is less than the first threshold and whether the determined download time is longer than the second threshold.

In yet another example embodiment, the method further includes incrementing the confidence level variable if the determined download time is greater than the second threshold, the confidence level variable indicating a level of confidence in the size of the buffer being equal to the previously recorded maximum buffer fullness, wherein the determining the size of the buffer determines the size of the buffer to be equal to the previously recorded maximum buffer fullness if the confidence level variable is greater than a confidence threshold.

In yet another example embodiment, if the confidence level variable is not greater than the confidence threshold, the method further includes delaying the sending of the requested video packet to the end user device.

In yet another example embodiment, the method further includes adjusting the determined fullness of the buffer and determining whether the adjusted fullness of the buffer is greater than a threshold, the threshold being set to a value lower than the determined size of the buffer, wherein the determining whether to introduce the delay introduces the delay if the adjusted fullness of the buffer is greater than the threshold.

In yet another example embodiment, the determining the rate determines the rate based on the determined plurality of variables as well as state information provided by a wireless service provider operating the network.

In one example embodiment, a server includes a processor configured to receive a request for a video segment from an end user device and determine a plurality of variables, the plurality of variables including at least one of a download time of a previously requested video segment by the end user device, a fullness of a buffer at the end user device and a size of the buffer. The processor is further configured to determine a rate of the requested video segment based on one or more of the determined plurality of variables and send the requested video segment at the determined rate to the end user device.

In yet another example embodiment, the processor is further configured to obtain the requested video segment at the determined rate from a content cache and determine whether to introduce a delay prior to the sending of the requested video segment to the end user device, wherein the processor is configured to delay sending the requested video segment to the end user by an amount of time equal to the delay upon the determining that the delay is to be introduced.

In yet another example embodiment, the processor is configured to determine the download time of the previously requested video segment as a period of time from when the server sends a request to a content cache for the previously requested video segment until the server receives the request for the video segment.

In yet another example embodiment, the processor is configured to determine a throughput of the network as a ratio of a size of the previously requested video segment to the determined download time.

In yet another example embodiment, the processor is configured to determine the plurality of variables determines the fullness of the buffer as a difference between a combined duration of playing the previously sent video segments and an amount of time elapsed from when the end user initiated playing a requested first video segment.

In yet another example embodiment, the processor is configured to determine the size of the buffer by determining whether a difference between the determined fullness of the buffer and a previously recorded maximum buffer fullness is less than a first threshold, determining whether the determined download time is longer than a second threshold if the difference is less than the first threshold, and determining the size of the buffer to be equal to the previously recorded maximum buffer fullness based on whether the difference is less than the first threshold and whether the determined download time is longer than the second threshold.

In yet another example embodiment, the processor is further configured to increment a confidence level variable if the determined download time is greater than the second threshold, the confidence level variable indicating a level of confidence in the size of the buffer being equal to the previously recorded maximum buffer fullness, wherein the processor is configured to determine the size of the buffer to be equal to the previously recorded maximum buffer fullness if the confidence level variable is greater than a confidence threshold.

In yet another example embodiment, if the confidence level variable is not greater than the confidence threshold, the processor is configured to delay the sending of the requested video packet to the end user device.

In yet another example embodiment, the processor is configured to adjust the determined fullness of the buffer and determine whether the adjusted fullness of the buffer is greater than a threshold, the threshold being set to a value lower than the determined size of the buffer, wherein the processor is configured to determine whether to introduce the delay introduces the delay if the adjusted fullness of the buffer is greater than the threshold.

In yet another example embodiment, the processor is further configured to determine the rate based on the determined plurality of variables as well as state information provided by a wireless service provider operating the network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein:

FIG. 5 illustrates a method of determining a size of the DASH Client buffer at an end user device, according to one example embodiment.

DETAILED DESCRIPTION OF EXAMPLE EMBODIMENTS

Figure 1:
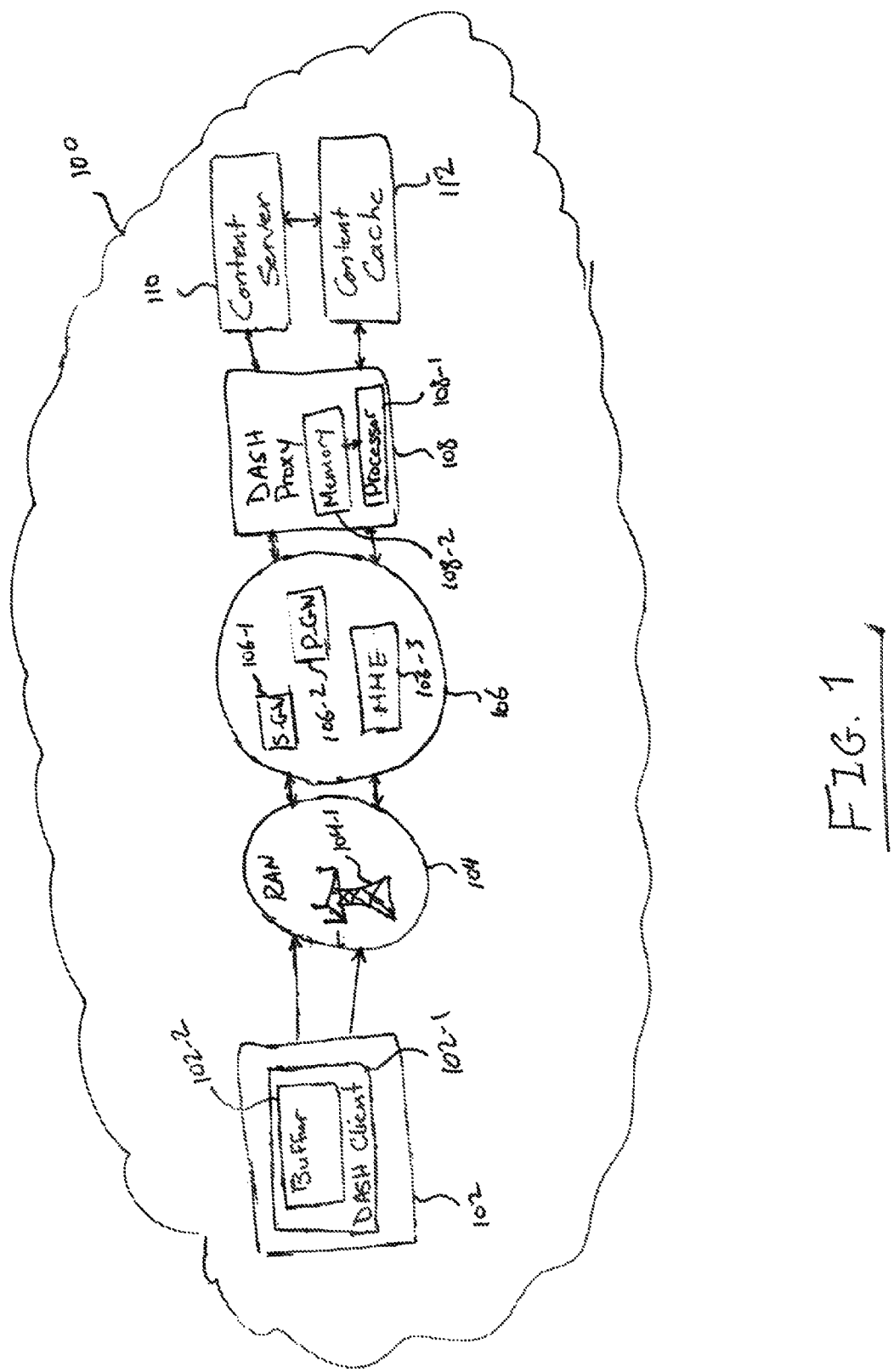
FIG. 1 depicts a network architecture, according to one example embodiment.

Various embodiments will now be described more fully with reference to the accompanying drawings. Like elements on the drawings are labeled by like reference numerals.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all possible modifications, equivalents, and alternatives falling within the scope of this disclosure.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged, and certain operations may be omitted or added to the process. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

In order to address the deficiencies of the client based RDA and the network based DASH proxy with RDA functions, as described above, the example embodiments described herein, enable one to obtain accurate and adequate measures, for each downloaded video segment, of a wireless network throughput, a DASH client cache buffer size and a DASH client cache buffer fullness at a DASH proxy in the network, thus enabling adequate RDA determination. The obtained measures may then be used as constraints when determining a rate of encoding for each requested video segment.

As will be described below, the determined DASH client cache buffer size and the determined DASH client cache buffer fullness may be utilized to ensure that the DASH client buffer remains in a "hungry" state. Hereinafter, the term "hungry" is used to denote that the DASH client cache buffer is not full and therefore, the client requests next video segment immediately after receiving the previously requested video segment.

Moreover, these measures may be obtained without the need for modifying the existing standards (e.g., DASH standard, HAS standard, etc.) currently employed for delivering VoD to end clients and/or modifying the DASH/HAS clients. Throughout the present application, the term DASH refers to any HTTP Adaptive Streaming (HAS) scheme such as DASH, Apple® HTTP Live Streaming (HLS), Microsoft® IIS Smooth streaming or Adobe® HTTP Dynamic Streaming (HDS).

FIG. 1 depicts a network architecture, according to one example embodiment. FIG. 1 depicts a network 100, which may include a client 102, a radio access network (RAN) 104, through which the client 102 communicates with other elements of the network and or other clients, a core network 106, a DASH proxy 108, a content server 110 and a content cache 112. The network 100 may be any type of access network that enable a communication between the DASH proxy 108 and the client 102. The access network may be any one of, but not limited to, different types of wireless networks such as 3G network (e.g., CDMA, WCDMA, HSPA, HSPA+), 4G network (e.g., LTE network or WiMAX network), a WiFi network, and any other available or to be developed type of wireless network technology. Furthermore, the access network may include any type of wired network including, but not limited to, a broadband network and a cable network such as fiber optic based networks, a DSL network, Fiber To The Home (FTTH) network, etc.

The RAN 104 may correspond to the access network used as the network 100. For example, when the network 100 is an LTE-based network, the RAN 104 may include an e-Node B 104-1 of an LTE-based wireless system. In one example embodiment, the RAN 104 may include more than one e-Node B 104-1. In case other types of networks are utilized instead of an LTE-based network, the element 104-1 of the associated RAN network 104 may be other types of base stations compatible with the underlying network technology.

The core network 106 may include elements including, but not limited to, S-GW 106-1, P-GW 106-2 and MME 106-3. The DASH proxy 108 may hereafter be referred to as simply the proxy 108. The proxy 108 may be a server that includes a processor 108-1 and a memory 108-2. The processor 108-1 may be a special purpose machine configured to execute computer-readable instructions stored on the memory 108-2 so as to implement the methods, which will be described with respect to FIGS. 2-5. In one example embodiment, the proxy 108 is located outside of the core network 106, as shown in FIG. 1. However, the proxy 108 may be located at other locations such as within the core network 106 or even closer to the base station 104.

The client 102 may communicate with the proxy 108 via the base station 104 and the core network 106. The client 102 may be any type of electronic device capable of receiving and playing video data such as mobile devices, laptops, computers, tablets, etc. Hereinafter, the client 102 may be referred to as the end user device 102 and the two terms may be used interchangeably. The end user device 102 may have a DASH client 102-1 associated therewith. The DASH client 102-1 may have a cache buffer 102-2 associated therewith, which hereinafter may be referred to as the buffer 102-2. Estimates of the size and fullness of the buffer 102-2 may be determined as will be described below. The video segments (e.g., video data packets) sent to the end user device 102 may be queued up in the buffer 102-2 prior to being played.

The network 100 may be a wired or a wireless network. In a wired network, the communication between the client 102 and the proxy 108 is enabled via a wired access network, examples of which have been described above (e.g., a broadband network such as DSL, FTTH, etc.).

As shown in FIG. 1, the content server 110 may be part of the network 100. The content server 110 may be configured to receive and process requests for video data. The content server 110 may contain information about available videos, where such information is included in a file known as Media Presentation Description (MPD) file for each of the available videos. The MPD file and its functionality will be described below. The network 100 may further include a content cache 112, which may contain an actual video that may be requested by the end user 102 and therefore may provide the video, in segments, to be delivered to the end user 102. The functionalities of the content server 110 and the content cache 112 will be further described below.

The content cache 112 may be a part of the network 100, as shown in FIG. 1. The content cache 112 may be located at a different location than the content server 110. In one example embodiment, the content server 110 and the content cache 112 may be located outside of the network 100 instead of being part of the network 100. In one example embodiment, the content cache 112 may be co-located with the proxy 108.

While FIG. 1 depicts a single content cache 112, in one example embodiment, there may be more than one content cache 112 with different URLs, containing segments of the video data requested by the end user device 102. The URLs of the segment locations at content caches may be listed in the MPD file.

While FIG. 1 illustrates one end user device 102 and one base station 104, there may be more than one end user device 102 and more than one base station 104. Each base station 104 may service more than one end user device 102.

Initially and in order to implement RDA functions at the proxy 108, the proxy 108 disables the RDA function at the DASH client 102-1 of the end user device 102. In one example embodiment, the proxy 108 disables the RDA function at the DASH client 102-1, as will be described below with respect to FIG. 2.

Figure 2:
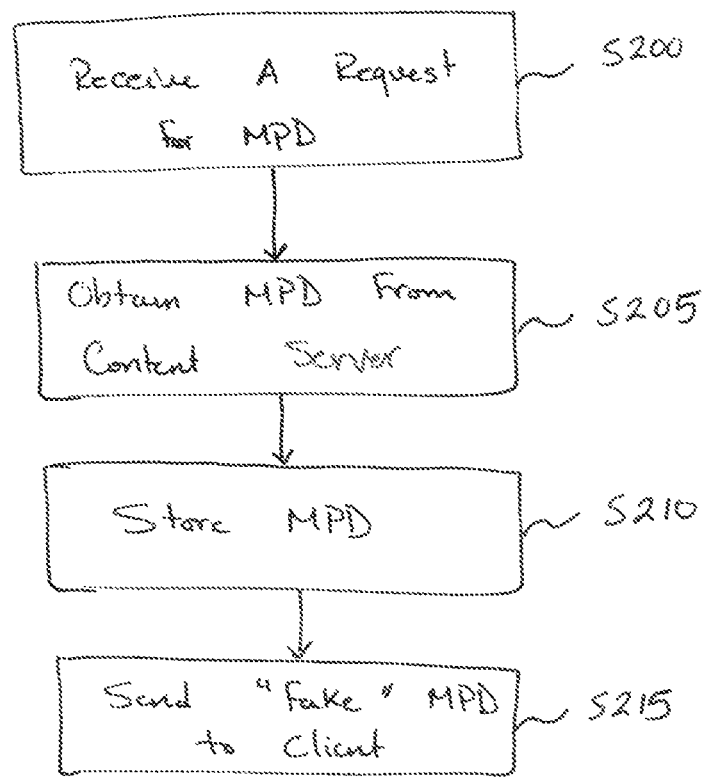
FIG. 2 illustrates a method for disabling a rate determination algorithm (RDA) function implemented at a client side when enabling RDA in the network, according to one example embodiment.

FIG. 2 illustrates a method for disabling a rate determination algorithm (RDA) implemented at a client side when enabling RDA in the network, according to one example embodiment. In one example embodiment, the operation of disabling the RDA at the end user device 102 is performed each time the DASH client 102-1 requests the MPD file. In one example embodiment, the end user 102 requests such MPD file only once in the beginning of a video session.

At S200, the proxy 108 receives a request from the DASH client 102-1 at the end user device 102 for the MPD file, which contains, among other information, a list of available video data rates, segment play durations, URL addresses of the segments in content cache 112. In one example embodiment, the MPD file may further include information on sizes of video segments encoded at the available rates.

At S205, the proxy 108 obtains the MPD file from the content server 110. At S210, the proxy 108 stores the MPD file received from the content server 110. At S215, the proxy 108 sends a "fake" MPD file to the DASH client 102-1 at the end user device 102, which contains a list of video segments with a single video data rate chosen out of plurality of available video data rates in the MPD file. In one example embodiment, sending a single video data rate for the available video segments to the DASH client 102-1 effectively disables the RDA function at the DASH client 102-1, since the DASH client 102-1 now only has a single rate to choose from for each video segment.

In one example embodiment, after disabling the RDA function at the client 102, the proxy 108, via the processor 108-1, may perform the following, which will be described in detail with respect to FIGS. 3-5. The proxy 108 receives request for a next video segment from the DASH client 102-1 (The proxy 108 ignores the rate requested by the DASH client 102-1, which was sent to the end user device 102 at S215). The proxy 108 then determines the download time of the previous video segment and based thereon, the network throughput using the video segment size from the MPD file. Thereafter, the proxy 108 determines the fullness of the buffer 102-2 (this may also be referred to as the DASH client buffer fullness). If the size of the buffer 102-2 (this may also be referred to as the DASH client buffer size) is not yet determined, the proxy 108 determines the size of the buffer 102-2 and, invokes RDA function to select the video rate of the next segment using the determined download time, the network throughput, the determined DASH client buffer fullness, the determined DASH client buffer size together with available rates from MPD as inputs and optionally state information (network wide information) provided by a wireless RAN.

Subsequently, the proxy 108, gets the next video segment at selected rate from the corresponding content cache 112 using MPD information, and sends this video segment to the DASH client 102-1 at the end user device 102. The proxy 108 may conditionally delay sending the video segment to the DASH client 102-1 at end user device 102 in order to prevent the fullness of buffer 102-2 from exceeding the size of buffer 102-2 thus keeping the DASH client buffer 102-2 hungry).

Figure 3:
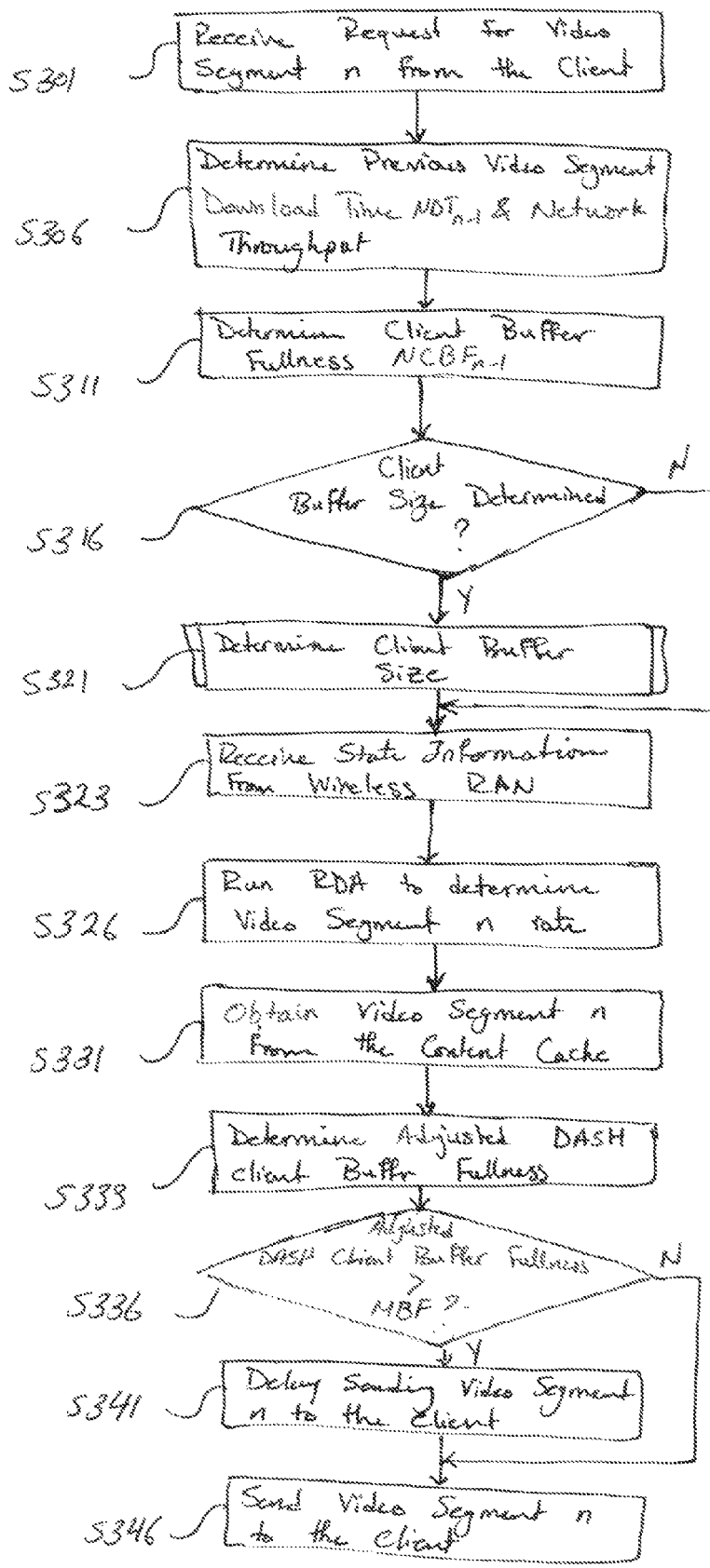
FIG. 3 illustrates a method of enabling network based rate determination for adaptive video streaming, according to one example embodiment.

FIG. 3 illustrates a method of enabling network based rate determination for adaptive video streaming, according to one example embodiment.

At S301, a request for $n^{th}$ video segment may be received at the proxy 108.

At S306, the proxy 108 calculates a New Download Time (NDT) for the $(n-1)^{th}$ video segment, $NDT_{n-1}$ and subsequently the throughput of the network 100 for the $(n-1)^{th}$ video segment. Example embodiments for determination of $NDT_{n-1}$, will be further described with reference to FIG. 4.

At S306 and upon calculating the $NDT_{n-1}$, the proxy 108 further determines a throughput of the network 100 for the $(n-1)^{th}$ video segment. In one example embodiment, the proxy 108 determines the network throughput as the ratio of a size of the video segment (n-1) to the calculated download $NDT_{n-1}$. In one example embodiment, the size of the video segment (n-1) may be known to the proxy 108 from the real MPD file, described above. In another example embodiment, the size of the video segment (n-1) may be recorded by the proxy 108 prior to sending the video segment (n-1) to the DASH client 102-1 at the end user device 102.

Thereafter, at S311, the proxy 108 determines a fullness of the DASH client buffer 102-2 at the end user device 102. This fullness may be referred to as New Client Buffer Fullness (NCBF), denoted as $NCBF_{n-1}$. In one example embodiment, $NCBF_{n-1}$ represents an estimate of the fullness of the buffer 102-2 after the $(n-1)^{th}$ packet has been sent to and received by the end user device 102.

In one example embodiment, $NCBF^{n-1}$ is determined using play duration of the video segments (e.g., video segments up to and including the $(n-1)^{th}$ video data packet) that were sent to and received by the end user device 102. The play duration may be known to the proxy 108 from the MPD file received from content server 110, as described at S205 and S210 in FIG. 2.

In one example embodiment, a conservative estimate of the fullness of the buffer 102-2 is determined as it is better to under-estimate the fullness of the buffer 102-2 than to over-estimate the same. This conservative estimate is based on the assumption that the end user device 102 starts playing a first video segment as soon as the user device 102 receives the first video segment. Accordingly, a time at which the Proxy 108 sends the requested video segment to the end user device 102 (e.g., ⑤ in FIG. 4, which will be described below) is used as a conservative estimate of the time at which the end user device 102 starts playing the received video segment. The time at which the proxy 108 receives request for the next video segment (e.g., video data packet n) is used as a conservative estimate of the time when the end user device 102 receives the requested video data packet n. Accordingly, the estimate of the fullness of the buffer 102-2 at the end user device 102 (in play duration seconds) is determined according to the following formula:

$(NCBF_{n-1})$=(play duration of video segments received at the end user device 102)−(Time elapsed from starting the playing of the first video segment).

The resulting conservative estimate for the buffer fullness carries an under-estimation error in the order of play duration of one to two video segments. In addition, client buffer under-runs need to be taken into consideration. For example, if during the playback of video segments there are instances where an underrun condition occurs (i.e. the fullness of the buffer 102-2 goes to zero) then the amount of time spent in the underrun condition is accounted for when calculating the fullness of the buffer 102-2.

As a numerical example, when a client has been downloading videos for the last 60 seconds, and the total play duration of all segments downloaded is 100 seconds then the buffer fullness would be 100−60=40 secs (this calculation will be further described below). However, if during the last 60 seconds there are 2 periods where the client's buffer fullness went to zero (each lasting 1 second) then the buffer fullness would be equal to 100−60+2=42 seconds.

Once the proxy 108 determines the $NCBF_{n-1}$ at S311, then at S316, the proxy 108 determines whether a size of the buffer 102-2 has been previously determined or not. In one example embodiment, the determined buffer size may represent an estimate of the size of the buffer 102-2 at the end user device 102. In one example embodiment, when the end user device 102 initiates a playback of a 5 minutes long video, during which the end user device 102 requests the video segments of the video, after 2 minutes from the start of the playback, the proxy 108 may determine the size of the buffer 102-2 at the end user device 102.

In one example embodiment, the proxy 108 may have previously determined the size of the buffer 102-2 at the end user device 102, from previously calculated and/or obtained (e.g., from external sources) buffer sizes for each combination of different types of devices utilized as the end user device 102 and different application types (e.g., different types of DASH clients). For example, if the proxy 108 knows that end user device 102 is a particular mobile computer device (e.g., a smartphone, a tablet, a laptop, a desktop, etc.), for example known to the proxy 108 from HTTP GET header information or auxiliary information received in unspecified ways, and the DASH client 102-1 is a particular DASH client provided by a content provider— then it might have the database entry of DASH client buffer size 55 seconds for a combination of (particular device, particular DASH client). The particular computer device may be any one of available devices capable of receiving and playing video data that is manufactured and available on the market for consumers/users. The DASH client may belong to any video data provider that provides video on demand services to interested consumers/users.

In one example embodiment, the proxy 108 may obtain the size of the buffer 102-2 from meta data corresponding to the end user device 102, which may have been learned and stored in the memory 108-2 of the proxy 108 over past sessions during which the end user device 102 requested and received video data for playback at the end user device 102.

Thereafter, whenever the end user device 102 requests subsequent video segments and the process of FIG. 3 is carried out for each requested video segment, the proxy 108 does not need to determine the size of the buffer 102-2 at the end user device 102. In other words, the DASH client buffer size is determined once during each session a video is played back at the end user device 102. In one example embodiment, the determination at S316 returns a negative result until the proxy 108 determines the size of the buffer 102-2 at the end user device 102. Thereafter and during each iteration that the end user device 102 requests a video segment in a given session, the determination at S316 returns a positive result.

If at S316, the proxy 108 determines that the size of the buffer 102-2 has been determined, then the process proceeds to S323, which will be further described below. Otherwise, if at S316, the proxy 108 determines that the size of the buffer 102-2 has not been determined, the process proceeds to S321.

At S321, the proxy 108 uses $NDT_{n-1}$ and $NCBF_{n-1}$ determined at S306 and S311, to determine a size of the buffer 102-2. The process of determining the size of the buffer 102-2 will be described below with reference to FIG. 5.

Thereafter, at S323, the proxy 108 may also receive state information from the RAN 104, which is used by the proxy 108 in determining the rate of the video segment n at S326. In one example embodiment, the state information may include for example wireless access network information, such as serving cell congestion, operator policies, channel conditions of the end user device(s), etc. In one example embodiment, the state information may include limits of the allowable rate for the client 102 based upon the service level agreement of the end user associated with the end user device 102. Thereafter, the process proceeds to S326, where the proxy 108 uses the appropriate variables prepared at S552 to run the RDA at the proxy 108 to determine a rate of the video segment n, requested by the client 102 at S301.

At S326, using the appropriate variables (e.g., $NDT_{n-1}$, $NCBF_{n-1}$ of the segment n−1 as determined at S306 and S311 and the current size of the buffer 102-2), the proxy 108 runs RDA to select the rate of the video segment n. In one example embodiment, the RDA may be any existing or future RDA algorithm that accepts segment download time (or network throughput), DASH client buffer fullness and optionally DASH client buffer size as inputs. In another example embodiment, the RDA may also take into account the state information received at S323. At S331, the proxy 108 requests and obtains the video segment n from the content cache 112. In one example embodiment the URL address of the segment n at the selected rate located at the corresponding content cache 112 may be obtained from the stored MPD file, as described above with respect to FIG. 2.

At S333, the proxy 108, adjusts the DASH client buffer fullness calculated in S311. In one example embodiment the adjustment is done to account for elapsed time between the steps S311 and S333. For example, the proxy 108 may determine the adjusted DASH client buffer fullness as $NCBF\_A_{n-1} = NCBF_{n-1} - (Time\_of\_S333 - Time\_of\_S311)$.

In another example embodiment, the adjustment also accounts for the play duration of the video segment n. For example, the proxy 108 may determine the adjusted DASH client buffer fullness as $NCBF\_A_{n-1} = NCBF_{n-1} - (Time\_of\_S333 - Time\_of\_S311) + (Play\_duration\_of\_video\ segment\_n)$. In yet another example embodiment, the adjustment accounts for the difference between the play duration of a video segment n and the expected download time $E(NDT_n)$ for the video segment n. For example, the proxy 108 may determine the adjusted DASH client buffer fullness as $NCBF\_A_{n-1} = NCBF_{n-1} - (Time\_of\_S333 - Time\_of\_S311) + (Play\_duration\_of\_segment\_n - Expected\_download\_time\_of\_segment\_n)$.

At S336 the proxy 108 determines whether the proxy 108 should delay sending the video segment n, received from the content cache 112 at S331, to the end user device 102. In one example embodiment, the proxy 108 makes such determination by determining whether the adjusted DASH client buffer fullness $NCBF\_A_{n-1}$ exceeds the maximal buffer fullness (MBF) threshold, as will be described below with reference to FIG. 5. In one example embodiment, the MBF is set to a value lower than the determined buffer 102-2 size to ensure that buffer 102-2 always stays "hungry" (e.g., its fullness does not exceed its size). In one example embodiment, the proxy 108 sets the MBF when the size of the buffer 102-2 is determined at S547. Prior to DASH client buffer size being determined at S547, MBF is set to a very large value so that the test in S336 fails. In another example embodiment, the proxy 108 determines the MBF using operator policy controlled buffer size (OPCBS) that is smaller than the determined estimate of the size of the buffer 102-2. This enforces a DASH client buffer fullness to be smaller than OPCBS by delaying sending the video segment n to the end user device 102, once the client buffer fullness reaches OPCBS. In one example embodiment, OPCBS may be reconfigured by the network operator at any time. For example, the network operator may modify the OPCBS based on changes in the network policy.

If at S336, the proxy 108 determines that the sending of the video segment n to the end user device 102 should be delayed, then at 5341, the proxy 108 delays sending the video segment n to the end user device 102. In one example embodiment, such delay is equal to the difference between the adjusted DASH client buffer fullness $NCBF\_A_{n-1}$ and the MBF. As a result, the DASH client buffer 102-2 consistently remains "hungry", which ensures that the calculations of the download time and the fullness of the buffer 102-2 for segment n will be valid.

Thereafter at S346, the proxy 108 sends the video segment n to the end user device 102.

However, if at S336, the proxy 108 determines that the sending of the video segment n to the end user device 102 should not be delayed, then the processor proceeds to S346 and the proxy 108 sends the video segment n to the client end user device.

In one example embodiment and as shown in FIG. 3, the process described above with reference to FIG. 3 may be repeated every time the proxy 108 receives a request for a video segment from the end user device 102 until the last video segment requested by the end user device in a given session (e.g., video playback session) is delivered to the end user device 102.

Hereinafter, the process based on which the proxy 108 determines the download time described at S306 will be described with respect to FIG. 4.

Figure 4:
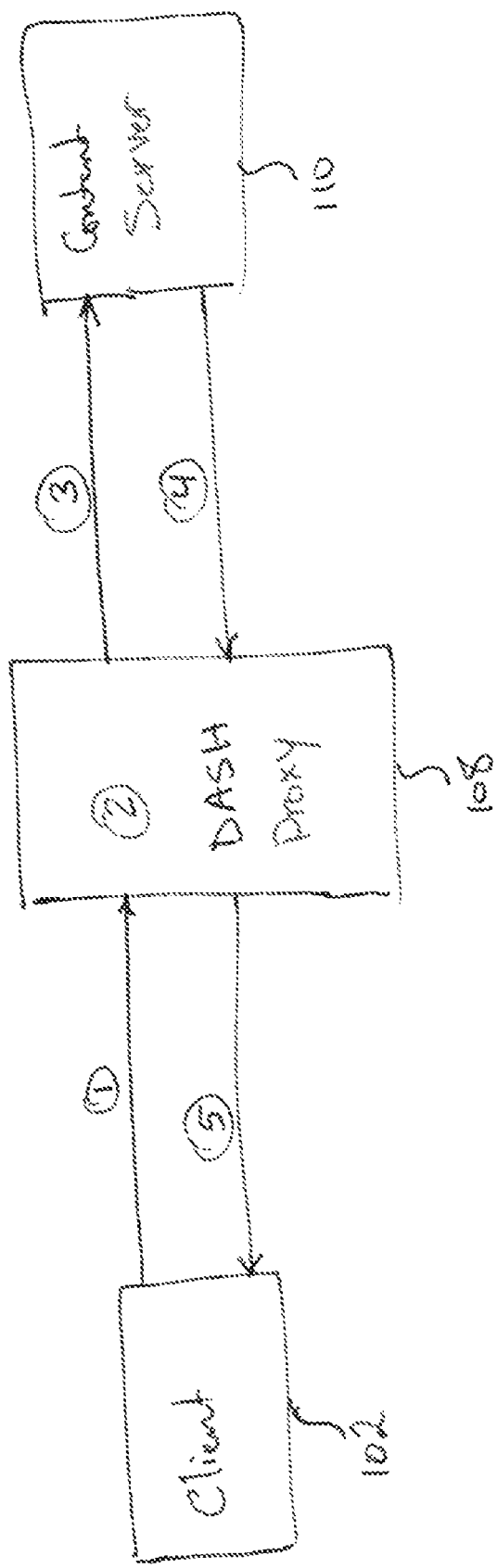
FIG. 4 illustrates how the download time of a video segment is determined by the RDA function in the network, according to one example embodiment.

FIG. 4 illustrates how the download time of a video segment is determined, according to one example embodiment. FIG. 4 illustrates a simplified version of the network 100 for purposes of describing how the $NDT_{n-1}$ is calculated.

In one example embodiment, the proxy 108 calculates the $NDT_{n-1}$ as the time from which the proxy 108 sends a request for the $(n-1)^{th}$ video segment to the content server 110 (this is indicated by ③ in FIG. 4) to the time at which the proxy 108 receives the request for the $n^{th}$ video segment from the end user device 102 (this is indicated by ① in FIG. 4). In other words, the $NDT_{n-1}$ is calculated as (③+④+⑤+①) (where ③, ④ and ⑤ prefer to video segment n−1 and ① refers to request for next video segment n), as shown in FIG. 4.

Compared to the traditional RDA at the DASH client, which estimate the download time of video segment n as (①+③+④+⑤) for video segment n−1, the above described method for calculating the $NDT_{n-1}$ is more precise for fast changing wireless conditions, since the time of RDA rate selection (prior to ③) is closer to the actual time of sending the video data packet, ④, than in the traditional DASH client case (where RDA rate selection is done prior to ①). ② shown in FIG. 4, is indicative of the time it takes for the proxy 108 to internally process a request for a video segment, which may be the same as the time it takes the DASH client to internally process the same. Accordingly, in the above determination ② need not be taken into consideration.

Hereinafter, the process based on which the proxy 108 determines the size of the DASH client buffer 102-2 at S321, will be described with respect to FIG. 5.

The determination of the size of the buffer 102-2 is also based on the assumption that if the buffer 102-2 is full after receiving the video segment (n−1), the DASH client 102-1 at the end user device 102 delays sending request for the next video data packet n, in order to not overfill the buffer 102-2. In one example embodiment, such delay may be equal to the difference between the play duration of the received video segment and the received video segment download time as measured by the client.

The method of determining client buffer size utilizes known property of DASH clients in that a DASH client asks for the next video segment immediately after receiving the previous one, if the DASH client buffer fullness is less that the DASH client buffer size (e.g., the DASH client buffer is in the "hungry" state). However, if the DASH client buffer fullness is at or above the DASH client buffer size, the DASH client delays sending request for the next video segment by the delay described in the preceding paragraph in order to not allow the DASH client buffer fullness to increase significantly beyond the DASH client buffer size.

In one example embodiment, a method of determining a DASH client buffer size may be summarized as follows. The proxy 108 records maximal calculated DASH client buffer fullness and monitors the measured video segment download times. Once the current DASH client buffer fullness is close to the recorded maximal buffer fullness and the download time shows unusual increase, then the proxy 108 suspects that the increase in the download time is caused by the DASH client introducing delay and therefore concludes that the maximal recorded DASH client buffer fullness is actually the DASH client buffer size. In one example embodiment, to eliminate false positives (e.g. unusually large download time due to deteriorating wireless channel conditions or increased serving cell load or congestion rather than delays introduced by the DASH client), the proxy 108 waits until the condition of interest (the download time being unusually high) repeats multiple times. The multiple occurrence of unusually high download times results in the proxy 108 increasing a confidence variable that represents a level of confidence in that the recorded maximal DASH client buffer fullness is the DASH client buffer size.

FIG. 5 illustrates a method of determining a size of the DASH client buffer at an end user device, according to one example embodiment.

At S502, the proxy 108, obtains the $NDT_{n-1}$ determined at S306 as well as the fullness of the buffer 102-2, $NCBF_{n-1}$, determined at S311. In one example embodiment, the Proxy 108 may obtain $NDT_{n-1}$ and $NCBF_{n-1}$ from the memory 108-2 in which these values are stored for future references.

At S507, the proxy 108 determines whether the determined fullness of the buffer 102-2, $NCBF_{n-1}$, is close to a Previously Recorded Maximal Client Buffer Fullness (PRMCBF) of the buffer 102-2. In one example embodiment, PRMCBF represents the highest value of the fullness of the buffer 102-2 recorded during the current video session.

In one example embodiment, the measure of closeness is whether the absolute value of the difference between $NCBF_{n-1}$ and PRMCBF is within a first threshold Δ. In one example embodiment, the first threshold Δ is an average duration of playing one video segment. In another example embodiment, the first threshold Δ is a dynamically calculated time and may be reconfigured.

Special considerations may be taken into account for initially setting the value of PRMCBF during the processing of request for the very first video segment (n=1) for the current video session. In one example embodiment, initially PRMCBF is set to 0. In another example embodiment, PRMCBF is initially set to a conservative estimate that is known to be lower than the size of the buffer 102-2. For example, based on experimental results, different types of devices may have different buffer sizes (e.g., 55 seconds, 65 seconds, etc.). Accordingly, in one example embodiment, PRMCBF may conservatively be set initially at 20 seconds.

If at S507, the proxy 108 determines that $NCBF_{n-1}$ is not sufficiently close to PRMCBF, then at S512, the proxy 108 determines whether PRMCBF needs to be updated because it is exceeded by $NCBF_{n-1}$. If at S512 the proxy 108 determines that $NCBF_{n-1}$ does not exceed PRMCBF, then the process proceeds to S552, which will be further described below.

However, if at S512, the proxy 108 determines that $NCBF_{n-1}$ exceeds PRMCBF, then at S517, the proxy 108 updates PRMCBF with the value of $NCBF_{n-1}$ and resets a confidence level variable for the new value of PRMCBF, which will be further described below. Thereafter, the process proceeds to S552, which will be further described below.

In one example embodiment, the confidence level is indicative of a level of confidence in that PRMCBF represents correctly the size of the buffer 102-2. As described above, the confidence level variable may be used to minimize the chance of outliers that represent delay in receiving video segments due to intermittent network events as opposed to delay in receiving such video segments due to the buffer 102-2 being full.

In one example embodiment, the proxy 108 resets the confidence level variable by setting the confidence level variable to 0.

Referring back to S507, if at S507 the proxy 108 determines that $NCBF_{n-1}$ is sufficiently close to PRMCBF, then at S522 the proxy 108 updates PRMCBF to make sure that it includes the latest $NCBF_{n-1}$, and then proceeds to S527.

At S527 the proxy 108 determines whether the determined $NDT_{n-1}$ is significantly longer than expected. $NDT_{n-1}$ being significantly longer than expected may be indicative of a delay added by the DASH client 102-1 before requesting segment n, which may in turn indicate that the buffer 102-2 is full.

In one example embodiment, $NDT_{n-1}$ being significantly longer than expected is determined by calculating the statistical expected value of download time $E(NDT_{n-1})$ of the segment n−1 based upon all or some of previously stored download times of prior video segments $NDT_k$ with 1<=k<n−1. In one example embodiment $E(NDT_{n-1})$ may be calculated as an average download time of two or more previously requested and delivered video segments.

In one example embodiment, the proxy 108 may determine that $NDT_{n-1}$ is significantly longer than $E(NDT_{n-1})$ if $NDT_{n-1}$ is greater than a product of a second threshold δ and the $E(NDT_{n-1})$. The second threshold δ may be a configurable variable that is determined based on empirical studies and may be for example a certain percentage (e.g., 15%).

If at S527, the proxy 108 determines that $NDT_{n-1}$ is not significantly longer than expected, then the process proceeds to S552, which will be further described below.

However, if at S527, the proxy 108 determines that $NDT_{n-1}$ is significantly longer than expected, then an assumption is made by the proxy 108 that the $NDT_{n-1}$ is unexpectedly large due to the DASH client 102-1 delaying sending a request for a next video segment because the buffer 102-2 is full.

Accordingly, at S532, the proxy 108 invalidates the $NDT_{n-1}$ (since it is assumed to contain DASH client induced delay) and increases its confidence that PRMCBF accurately represents the size of the buffer 102-2. In one example embodiment, the confidence is increased by incrementing the confidence level variable representing the level of confidence.

At S537, the proxy 108 determines whether the level of confidence in that PRMCBF accurately represents the size of the buffer 102-2, is sufficiently high. In one example embodiment, the proxy 108 makes such determination by comparing the current value of the confidence level variable with a confidence threshold, which may be a configurable variable determined based on empirical studies.

If at S537, the proxy 108 determines that the confidence level is not greater than the confidence threshold, then at S542, the proxy 108 introduces a delay prior to proceeding to step S552. As a result of the delay the fullness of the buffer 102-2 will fall below the size of the buffer 102-2, therefore ensuring that there would be no DASH client introduced delay before sending request for the next video segment n+1. At S542, the proxy 108 updates $NCBF_{n-1}$ to reflect the delay (e.g., updated $NCBF_{n-1}$ is $NCBF_{n-1}$−the delay). Although according to FIG. 5, the proxy 108 introduces the delay at S542, the delay may be introduced at any other time during the process before the requested video segment is sent to the DASH client buffer 102-1 at the end user device 102.

In one example embodiment, the delay in S542 may be equal to the play duration of one to two video segments. In another example embodiment, the delay may be a product of a delay factor and a maximum of an average duration of each requested video segment or the duration of the last requested video segment. The delay factor may be a configurable variable determined based on empirical studies.

However, if at S537, the proxy 108 determines that the confidence level variable is greater than the confidence threshold (meaning that the confidence in PRMCBF accurately representing the size of the buffer 102-2 is sufficiently high), in S547 the proxy 108 sets the size of the buffer 102-2 to be equal to the current value of PRMCBF.

At S547, the proxy 108 also sets a Maximal Buffer Fullness (MBF) threshold for the buffer 102-2 to be lower than the newly set size of the buffer 102-2. The MBF will be described below with reference to S336 of FIG. 3. In one example embodiment, initially and before the proxy 108 determines the size of the buffer 102-2, the MBF is set to a very large value so the test in S336, described below, always fails.

Thereafter, at S552, the proxy 108 passes/feeds the appropriate variables ($NDT_{n-1}$, $NCBF_{n-1}$, client buffer size (if set) and MBF), to the RDA algorithm for determining the rate of the video segment n, as described above with reference to FIG. 3. As shown in FIG. 5 and described above, depending upon which path taken in FIG. 5 to reach S552, variable $NDT_{n-1}$ may or may not be valid, and the size of the buffer 102-2 may or may not be set.

Variations of the example embodiments are not to be regarded as a departure from the spirit and scope of the example embodiments, and all such variations as would be apparent to one skilled in the art are intended to be included within the scope of this disclosure.

What is claimed is:

1. A method for enabling a network based rate determination for adaptive video streaming, the method comprising:
 receiving, by a server, a request for a current video segment from an end user device;
 determining, by the server, a plurality of variables, the plurality of variables including a download time of a previously requested video segment by the end user device, an estimate of fullness of a buffer at the end user device and an estimate of a size of the buffer, the download time being a period of time from when the server sends an earlier request to a content server for the previously requested video segment until the server receives the request for the current video segment from the end user device; and
 performing, by the server, the rate determination based on one or more of the determined plurality of variables;
 requesting, by the server, the current video segment from the content server; and
 sending, by the server, the current video segment to the end user device according to the determined rate.

2. The method of claim 1, further comprising:
 determining a throughput of the network as a ratio of a size of the requested current video segment to the determined download time.

3. The method of claim 1, wherein the determining the plurality of variables determines the estimate of the fullness of the buffer as a difference between a duration of playing the previously requested video segments and an amount of time elapsed from when the end user initiated playing a requested first video segment.

4. The method of claim 3, wherein the determining the plurality of variables determines the estimate of the size of the buffer by,
 determining a first difference between the determined estimate of the fullness of the buffer and a third variable, the third variable being an initial estimate of the fullness of the buffer,
 determining a second difference between the determined download time and an expected value of the download time if the first difference is less than or equal to a first threshold, and selectively determining the estimate of the size of the buffer to be equal to one the estimated fullness of the buffer and the third variable based on the first and second differences.

5. The method of claim 4, further comprising:
determining whether the determined estimate of the fullness of the buffer greater than the third variable if the first difference is not less than the first threshold; and
if the determined estimate of the fullness of the buffer is greater than the third variable,
resetting a confidence variable to zero, the confidence variable indicating a level of confidence in the estimated fullness of the buffer being equal to the third variable, and
updating the third variable to be equal to the determined estimate of the fullness of the buffer.

6. The method of claim 4, further comprising:
incrementing the confidence variable if the second difference is greater than a product of the expected value of the download time and a second threshold, wherein
the selectively determining the estimate of the size of the buffer determines the estimate of the size of the buffer to be equal to a maximum of the third variable and the estimated fullness of the buffer, if the confidence variable is greater than a confidence threshold.

7. The method of claim 6, wherein if the confidence variable is less than confidence threshold, the method further comprises:
delaying a preparing of the plurality of variables for performing the rate determination; and
excluding the determined download time and a throughput of the network from the plurality of variables when the performing performs the rate determination.

8. The method of claim 1, wherein,
the estimated fullness of the buffer and the estimated size of the buffer are used as upper bounds on a fullness of the buffer and a size of the buffer at the end user device, respectively, and
the performing performs the rate determination such that an instantaneous estimate of the fullness of the buffer and an instantaneous estimate of the size of the buffer remain below the upper bounds.

9. A server comprising: a processor configured to,
receive a request for a current video segment from an end user device;
determine a plurality of variables, the plurality of variables including a download time of a previously requested video segment by the end user device, an estimate of fullness of a buffer at the end user device and an estimate of a size of the buffer, the download time being a period of time from when the server sends an earlier request to a content server for the previously requested video segment until the server receives the request for the current video segment from the end user device;
perform the rate determination based on one or more of the determined plurality of variables
request the video segment from a content server; and
send the video segment to the end user device according to the determined rate.

10. The server of claim 9, wherein the processor is configured to determine a throughput of the network as a ratio of a size of the requested current video segment to the determined download time.

11. The server of claim 9, wherein the processor is configured to determine the estimate of the fullness of the buffer as a difference between a duration of playing the previously requested video segments and an amount of time elapsed from when the end user initiated playing a requested first video segment.

12. The server of claim 11, wherein the processor is configured to determine the estimate of the size of the buffer by,
determining a first difference between the determined estimate of the fullness of the buffer and a third variable, the third variable being an initial estimate of the fullness of the buffer,
determining a second difference between the determined download time and an expected value of the download time if the first difference is less than or equal to a first threshold, and
selectively determining the estimate of the size of the buffer to be equal to one the estimated fullness of the buffer and the third variable based on the first and second differences.

13. The server of claim 12, wherein the processor is configured to,
determine whether the determined estimate of the fullness of the buffer greater than the third variable if the first difference is not less than the first threshold; and
if the determined estimate of the fullness of the buffer is greater than the third variable,
reset a confidence variable to zero, the confidence variable indicating a level of confidence in the estimated fullness of the buffer being equal to the third variable, and
update the third variable to be equal to the determined estimate of the fullness of the buffer.

14. The server of claim 12, wherein the processor is configured to,
increment the confidence variable if the second difference is greater than a product of the expected value of the download time and a second threshold, wherein
selectively determine the estimate of the size of the buffer determines the estimate of the size of the buffer to be equal to a maximum of the third variable and the estimated fullness of the buffer, if the confidence variable is greater than a confidence threshold.

15. The server of claim 14, wherein if the confidence variable is less than confidence threshold, the processor is configured to,
delay a preparing the plurality of variables for performing the rate determination; and
exclude the determined download time and a throughput of the network from the plurality of variables when the performing performs the rate determination.

16. The server of claim 9, wherein,
the estimated fullness of the buffer and the estimated size of the buffer are used as upper bounds on a fullness of the buffer and a size of the buffer at the end user device, respectively, and
the processor is configured to perform the rate determination such that an instantaneous estimate of the fullness of the buffer and an instantaneous estimate of the size of the buffer remain below the upper bounds.

* * * * *